(12) United States Patent
Summons

(10) Patent No.: US 9,775,460 B2
(45) Date of Patent: Oct. 3, 2017

(54) LIP SEALS FOR COOKING APPARATUS AND COOKING APPARATUS HAVING LIP SEAL

(71) Applicant: Henny Penny Corporation, Eaton, OH (US)

(72) Inventor: Gary F. Summons, Trotwood, OH (US)

(73) Assignee: Henny Penny Corporation, Eaton, OH (US)

(*) Notice: Subject to any disclaimer, the term of this patent is extended or adjusted under 35 U.S.C. 154(b) by 282 days.

(21) Appl. No.: 14/420,319

(22) PCT Filed: Aug. 8, 2013

(86) PCT No.: PCT/US2013/054207
§ 371 (c)(1),
(2) Date: Feb. 6, 2015

(87) PCT Pub. No.: WO2014/026045
PCT Pub. Date: Feb. 13, 2014

(65) Prior Publication Data
US 2015/0196156 A1    Jul. 16, 2015

Related U.S. Application Data

(60) Provisional application No. 61/681,116, filed on Aug. 8, 2012.

(51) Int. Cl.
*A47J 27/08* (2006.01)
*A47J 36/06* (2006.01)

(52) U.S. Cl.
CPC ........... *A47J 27/0817* (2013.01); *A47J 27/08* (2013.01); *A47J 36/06* (2013.01)

(58) Field of Classification Search
CPC .............................. A47J 27/08; A47J 27/0817
See application file for complete search history.

(56) References Cited

U.S. PATENT DOCUMENTS 2,600,714 A * 6/1952 Wenscott ............ A47J 27/0806
220/298
2,700,196 A * 1/1955 Panhard ................. B60J 10/244
277/642

(Continued)

FOREIGN PATENT DOCUMENTS

CN         2153303 Y     1/1994
CN       201076352 Y     6/2008
(Continued)

OTHER PUBLICATIONS

The State Intellectual Property Office of the People's Republic of China; First Office Action issued in Application No. CN 2013800456446.6, dated Mar. 30, 2016.
(Continued)

*Primary Examiner* — Sean Michalski
(74) *Attorney, Agent, or Firm* — Wood Herron & Evans LLP

(57) ABSTRACT

A cooking apparatus comprises a cooking chamber configured to hold a cooking medium therein, a lid configured to cover the cooking chamber, and a sealing member disposed between the lid and the cooking chamber to create a seal between the cooking chamber and the lid. The lid comprises a lid liner and a retaining member disposed on an inner surface of the lid, the retaining member configured to retain the sealing member adjacent to an edge of the lid. The sealing member comprises a lip portion comprising an upper leg and a lower leg, each disposed at an angle to a longitudinal axis of the sealing member to substantially form a V shape at one longitudinal end of the sealing member, and a ridge portion comprising an upper ridge and a lower ridge, each disposed at an opposite longitudinal end of the sealing member.

19 Claims, 8 Drawing Sheets

(56) References Cited

U.S. PATENT DOCUMENTS

| | | | | |
|---|---|---|---|---|
| 3,447,781 A * | 6/1969 | Fawkes | F16K 5/0684 | 251/315.05 |
| 3,773,338 A * | 11/1973 | Fidler | F16J 15/32 | 217/34 |
| 3,907,310 A * | 9/1975 | Dufour | F16J 15/3452 | 165/9 |
| 3,909,076 A * | 9/1975 | Kato | F16J 15/3456 | 277/363 |
| 3,952,455 A * | 4/1976 | McAlarney | F25D 23/087 | 49/496.1 |
| 3,976,218 A * | 8/1976 | Stoermer | A47J 27/092 | 220/316 |
| 4,030,730 A * | 6/1977 | Maguire | B62D 55/0887 | 277/380 |
| 4,059,742 A * | 11/1977 | Baron | H05B 6/763 | 219/685 |
| 4,091,961 A * | 5/1978 | DuBois | B65D 45/32 | 220/319 |
| 4,138,049 A * | 2/1979 | McAlarney | F25D 23/087 | 277/629 |
| 4,145,026 A * | 3/1979 | Chronister | F16K 3/188 | 251/159 |
| 4,162,391 A * | 7/1979 | Sciaky | H01J 37/18 | 219/121.13 |
| 4,172,538 A * | 10/1979 | Thelberg | B60P 1/006 | 222/389 |
| 4,189,158 A * | 2/1980 | Roussin | F16J 15/46 | 277/389 |
| 4,270,666 A * | 6/1981 | Beckman | B65D 39/0047 | 215/260 |
| 4,275,641 A * | 6/1981 | Kopp | B62D 5/12 | 277/589 |
| 4,276,990 A * | 7/1981 | Chiodo | B65D 51/1666 | 220/203.12 |
| 4,399,863 A * | 8/1983 | Banasiuk | F28D 19/047 | 165/9 |
| 4,434,909 A * | 3/1984 | Ott | A47J 27/0806 | 220/293 |
| 4,445,695 A * | 5/1984 | Wilkinson | B63H 23/321 | 277/380 |
| 4,461,488 A * | 7/1984 | Harms | B62D 55/0887 | 277/380 |
| 4,498,695 A * | 2/1985 | Pardo | A47J 27/0817 | 220/315 |
| 4,685,587 A * | 8/1987 | Sebillotte | A47J 27/092 | 220/295 |
| 4,997,101 A * | 3/1991 | King | A47J 27/08 | 220/314 |
| 5,641,085 A * | 6/1997 | Lonbardo | A47J 27/09 | 215/270 |
| 5,695,199 A * | 12/1997 | Rao | F16J 9/20 | 277/455 |
| 6,113,482 A * | 9/2000 | Licata | F16J 15/3284 | 277/380 |
| 6,551,282 B1 * | 4/2003 | Exline | A61B 17/3462 | 604/167.01 |
| 6,695,319 B1 * | 2/2004 | Anota | A47J 27/09 | 220/203.11 |
| 7,370,865 B2 * | 5/2008 | Vik | B62D 55/15 | 277/380 |
| 7,708,285 B2 * | 5/2010 | Grimanis | F16J 15/36 | 277/379 |
| 7,933,534 B2 * | 4/2011 | Hoshi | G03G 15/0898 | 399/103 |
| 8,226,088 B2 * | 7/2012 | Kometani | F16J 15/344 | 277/377 |
| 8,820,220 B2 * | 9/2014 | Thelen | A47J 27/09 | 99/337 |
| 9,086,149 B2 * | 7/2015 | Qiang | F16J 15/027 | |
| 9,103,445 B2 * | 8/2015 | Schroeder | F16J 15/164 | |
| 9,296,467 B1 * | 3/2016 | Hollibaugh | B64C 3/34 | |
| 9,554,420 B2 * | 1/2017 | Wiley | H05B 1/023 | |
| 2013/0043253 A1 | 2/2013 | Yang et al. | | |
| 2015/0247604 A1 * | 9/2015 | McKinzie | F16D 1/101 | 403/34 |

FOREIGN PATENT DOCUMENTS

| | | |
|---|---|---|
| CN | 201996290 U | 10/2011 |
| EP | 2342996 A2 | 7/2011 |
| JP | 58-037815 | 3/1983 |
| JP | 62-290419 | 12/1987 |
| JP | 1-230316 A | 9/1989 |
| JP | 4-99509 A | 3/1992 |
| JP | 2002522140 A | 7/2002 |
| WO | 2011/083284 A2 | 7/2011 |

OTHER PUBLICATIONS

United States Patent and Trademark Office, International Search Report for International Application No. PCT/US2013/054207, dated Jan. 17, 2014.

Eropean Patent Office, Extended European Search Report for European Patent Application No. 13828074.8, dated Mar. 8, 2016.

Japanese Patent Office, Office Action issued in corresponding JP Application No. 2015-526720, dated Apr. 18, 2017 (and English language translation), 18 pages.

* cited by examiner

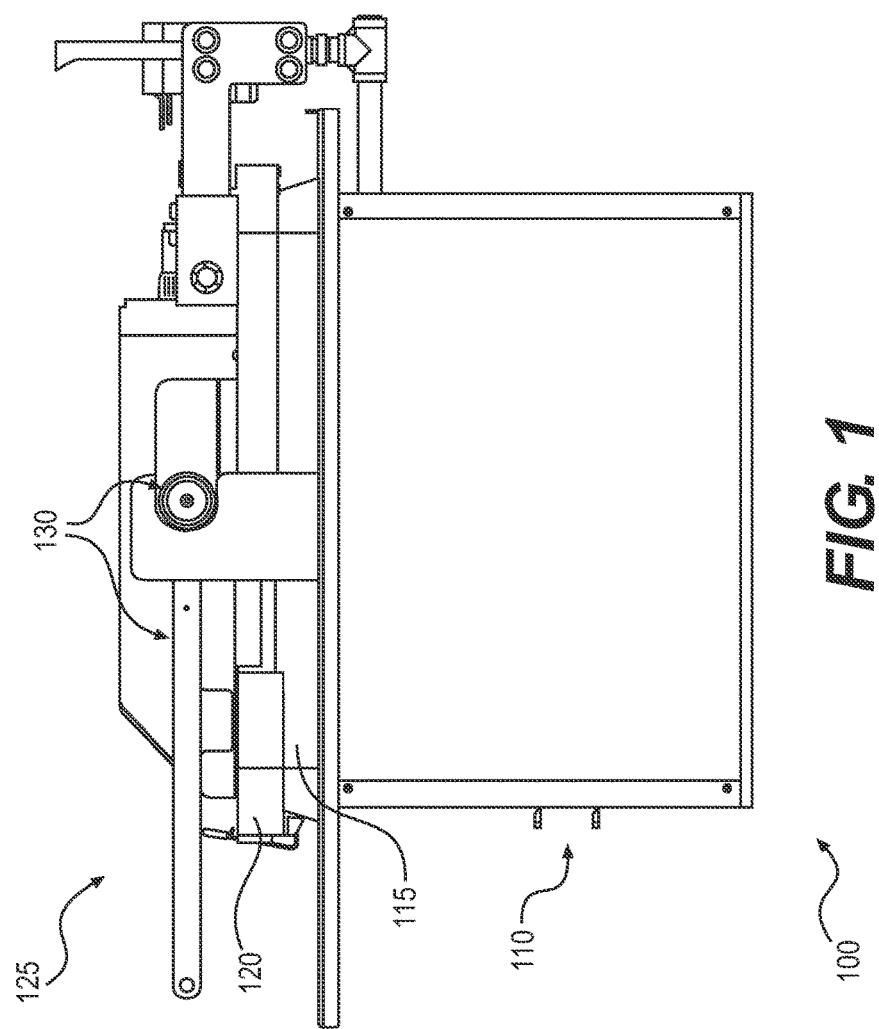

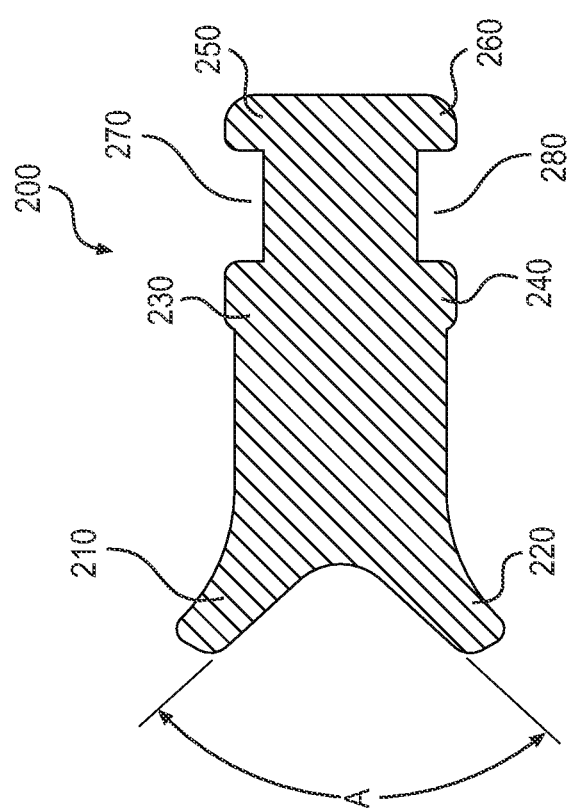

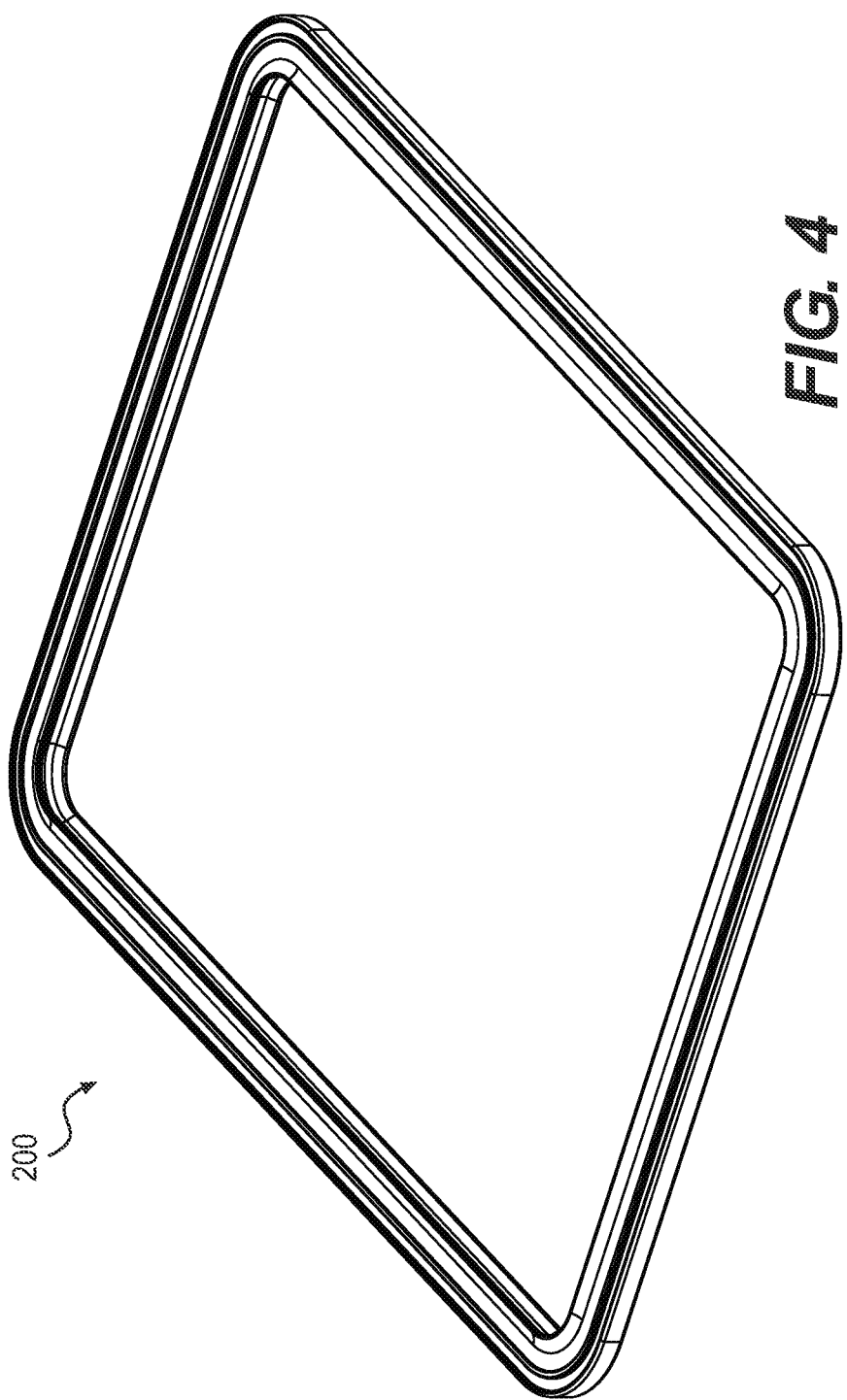

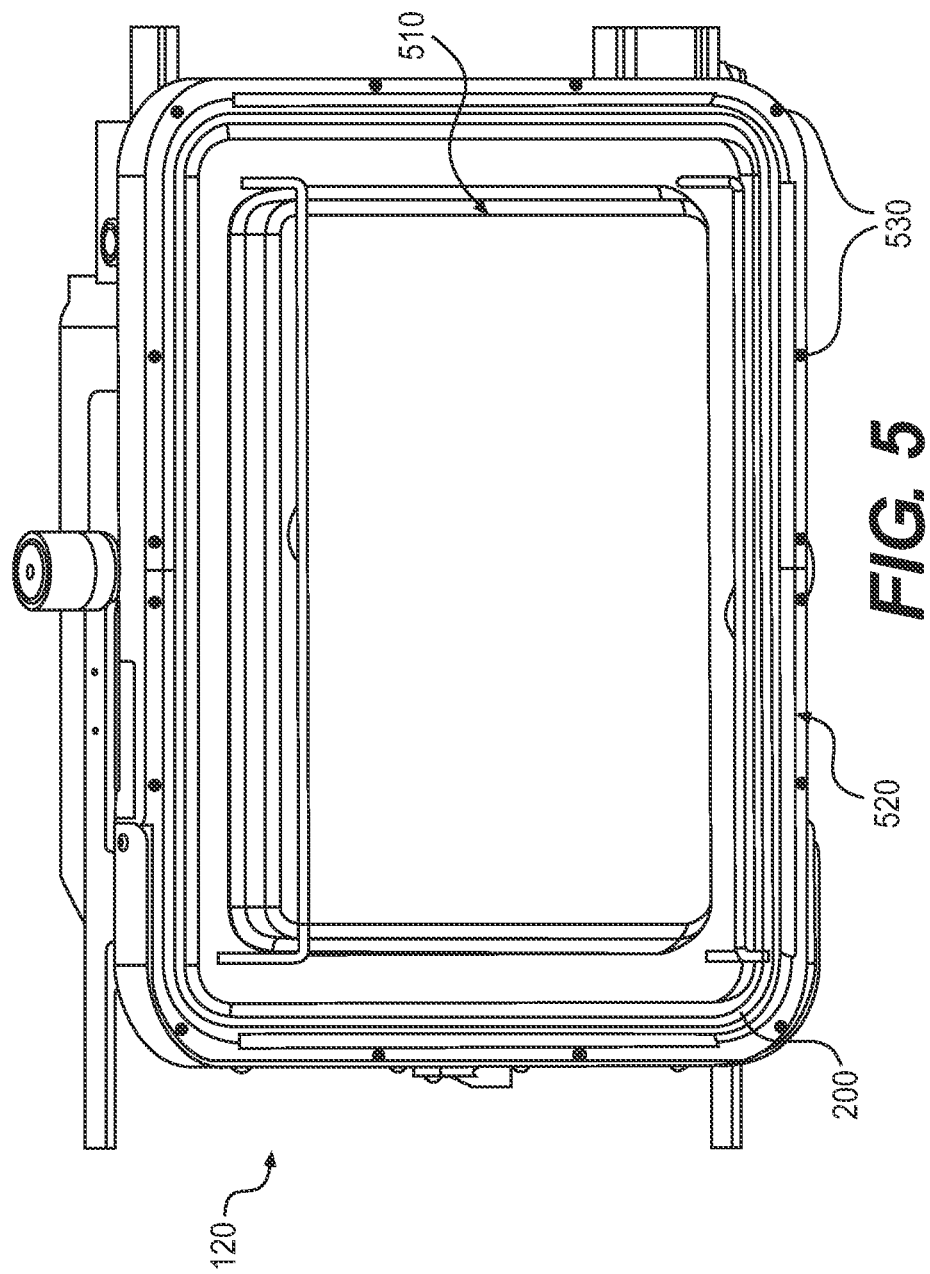

LIP SEALS FOR COOKING APPARATUS AND COOKING APPARATUS HAVING LIP SEAL

CROSS-REFERENCE TO RELATED APPLICATIONS

This application is a U.S. National Stage Patent Application under 37 U.S. C. §371 of International Patent Application No. PCT/US2013/054207, filed on Aug. 8, 2013, which claims priority from U.S. Provisional Patent Application No. 61/681,116, filed on Aug. 8, 2012, each of which are incorporated herein by reference.

BACKGROUND OF THE INVENTION

1. Field of the Invention

The invention relates generally to lip seals for sealing a vessel in a cooking apparatus, and cooking apparatus including such seals.

2. Description of Related Art

Known cooking apparatus, such as pressure fryers, are used to cook various food products, e.g., poultry, fish, potato products, and the like. Such cooking apparatus may include one or more cooking chambers, e.g., fryer pots, which may be filled with a cooking medium, e.g., an oil, a liquid shortening, or a meltable-solid shortening. Such cooking apparatus also may include a heating element, e.g., an electrical heating element, such as a heating oil medium, or a gas heating element, such as a gas burner and gas conveying tubes, which heat the cooking medium in the cooking chamber. The amount of time sufficient to cook or to complete the cooking of the food product at a given cooking temperature depends on the type of food product that is cooked. In a pressure fryer, when the food product is submerged in the oil, the food product cooks, releasing heat and steam, which pressurizes the cooking chamber. The increased pressure in the cooking chamber allows for thorough cooking in reduced time, and assists in preventing drying out of the food product.

Known pressure fryer apparatus may include a lid to seal the cooking chamber once the food product has been placed inside the cooking chamber. The lid with a gasket or sealing member may create a seal with the chamber body that is sufficient to withstand the pressure from the cooking operation. In known cooking apparatuses, a great amount of force (e.g., greater than 2000 lbs.) is required on the seal member to create an initial seal between the lid and the cooking chamber. Thus, known seals may be difficult to engage, requiring great force, and a suitable seal may not be created without the required force.

SUMMARY OF THE INVENTION

Therefore, a need has arisen for seals for cooking apparatus and cooking apparatus including such seals, which overcome these and other shortcomings of the related art. A lip seal according to embodiments of the invention may be configured to provide a seal at low pressure and may require a smaller input force to create an initial seal between a lid and cooking chamber.

In an embodiment of the invention, a cooking apparatus comprises a cooking chamber configured to hold a cooking medium therein, a lid configured to cover the cooking chamber, and a sealing member disposed between the lid and the cooking chamber. The lid comprises a lid liner disposed on an inner surface of the lid, and a retaining member disposed on the inner surface of the lid adjacent to an edge of the lid. The sealing member comprises a lip portion comprising an upper leg and a lower leg, each disposed at an angle to a longitudinal axis of the sealing member to substantially form a V shape at one longitudinal end of the sealing member, and a ridge portion comprising an upper ridge and a lower ridge, each disposed at an opposite longitudinal end to the one longitudinal end of the sealing member. The retaining member is configured to retain the sealing member, and the sealing member is configured to create a seal between the cooking chamber and the lid.

In another embodiment of the invention, a sealing member comprises a lip portion comprising an upper leg and a lower leg, each disposed at an angle to a longitudinal axis of the sealing member to substantially form a V shape at one longitudinal end of the sealing member, and a ridge portion comprising an upper ridge and a lower ridge, each disposed at an opposite longitudinal end to the one longitudinal end of the sealing member. The lip portion is configured to be disposed between a lid and a cooking chamber of a cooking apparatus, and the lip portion is configured to create a seal between the cooking chamber and the lid.

One advantage of the sealing member is that a small input force is required to create an initial seal between a lid and cooking chamber. Another advantage is that the lip portion allows for greater variation in the shape and size of mating parts. A further advantage of the sealing member is that it may be formed as a substantially rectangular shape and may have rounded corners.

Other objects, features, and advantages of the present invention are apparent to persons of ordinary skill in the art in view of the following detailed description of embodiments of the invention and the accompanying drawings.

BRIEF DESCRIPTION OF THE DRAWINGS

For a more complete understanding of the embodiments of the present invention, needs satisfied thereby, and the objects, features, and advantages thereof, reference now is made to the following description taken in connection with the accompanying drawings.

FIG. 1 is a partial side view of a cooking apparatus, according to an embodiment of the invention.

FIG. 3 is a detail view of the cross-sectional view of the sealing member of FIG. 2A, taken along line A-A.

FIG. 4 is a perspective view of a sealing member, according to an embodiment of the invention.

FIG. 5 is a bottom view of a lid assembly with sealing member, according to an embodiment of the invention.

DETAILED DESCRIPTION OF EMBODIMENTS OF THE INVENTION

Figure 2A:
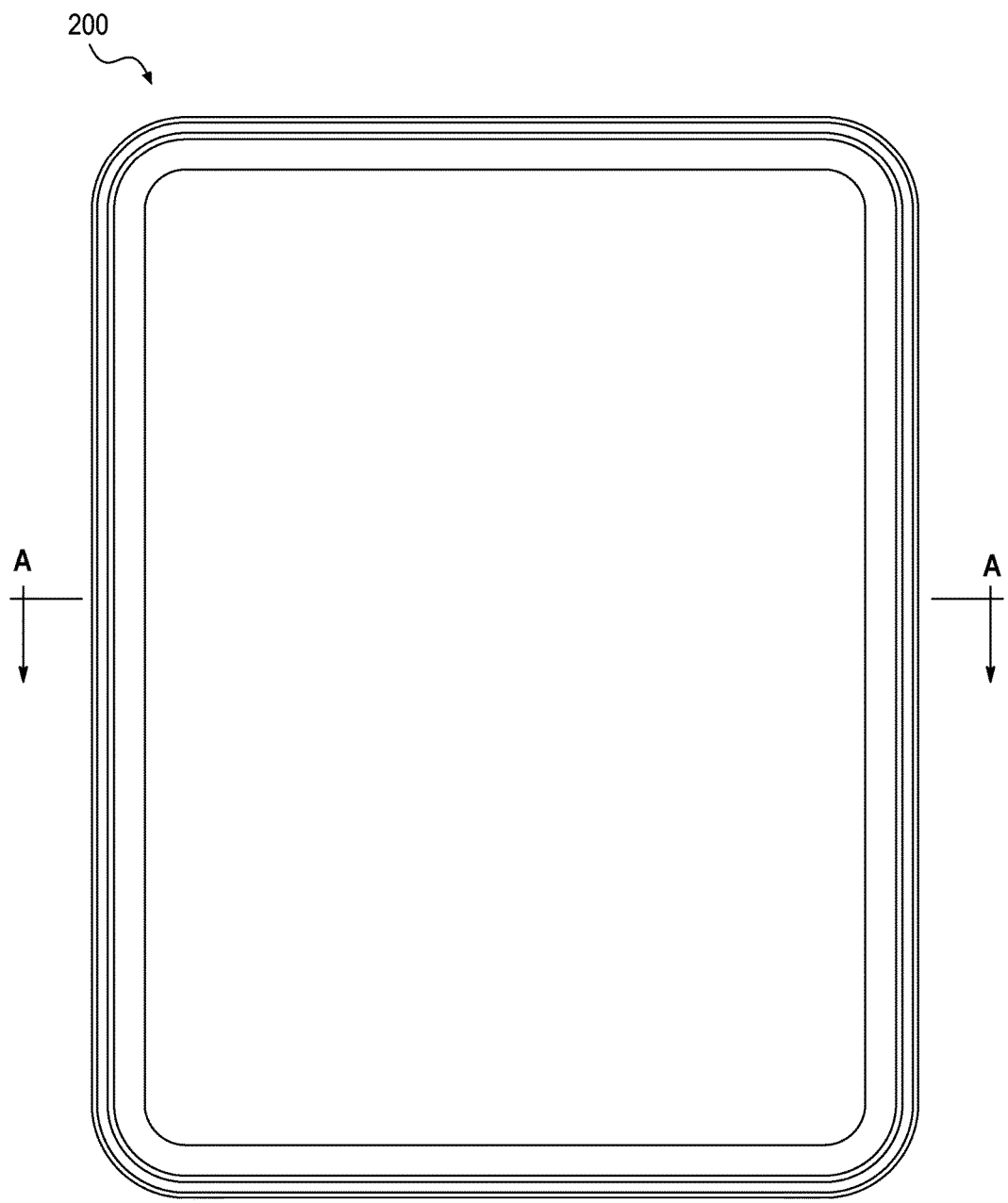
FIG. 2A is a top view of a sealing member, according to an embodiment of the invention.

Embodiments of the present invention, and their features and advantages, may be understood by referring to FIGS. 1-7, like numerals being used for corresponding parts in the various drawings.

FIG. 1 depicts a portion of a pressure fryer as an exemplary cooking apparatus 100, according to an embodiment of the invention. Cooking apparatus 100 may include a cooking chamber 110 that may be configured to hold cooking media, e.g., an oil, a liquid shortening, a meltable-solid shortening, or the like, for cooking food product. Cooking chamber 110 may include a cooking chamber band 115 at an upper portion of cooking chamber 110. A lid 120 of cooking chamber 110 may be configured to cover the top of cooking chamber 110 by closing on cooking chamber band 115.

Lid 120 may include a lid assembly 125, which may include, for example, a handle (not shown) and a cam assembly 130. Cam assembly 130 may assist with opening and closing lid 120 on cooking chamber 110. In this case, an operator may apply a relatively small force to cam assembly 130, which may impart a linear force to lid assembly 125. Lid assembly 125 may thereby move vertically along a fixed track or rail to open and close lid 120 on cooking chamber 110 in response to the applied force. In alternative embodiments, lid assembly 125 may include a hinge assembly for opening and closing lid 120. With hinge assembly 125, a radial force may be applied to open and close lid 120, and cam assembly 130 may be omitted. When lid 120 is closed onto the top of cooking chamber 110, a seal may be created between lid 120 and cooking chamber 110.

Cooking apparatus 100 may include a gasket or sealing member 200, depicted in FIG. 2A, according to an embodiment of the invention. Sealing member 200 may create a seal between lid 120 and cooking chamber 110. Sealing member 200 may be configured to create the seal between lid 120 and cooking chamber 110 with a relatively small input force. Sealing member 200 may be rectangular in shape and may have rounded corners. In alternative embodiments, sealing member 200 may have straight corners and may be in the form of alternative shapes and sizes to accommodate different styles of cooking chambers or lids.

Figure 2B:
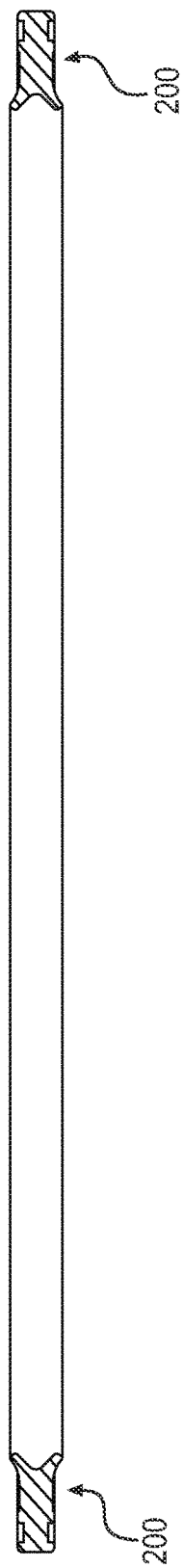
FIG. 2B is a cross-sectional view of the sealing member of FIG. 2A, taken along line A-A.

FIG. 2B depicts a cross-sectional view of sealing member 200, taken along line A-A in FIG. 2A. FIG. 3 depicts a detail view of the cross-sectional view of sealing member 200 as depicted in FIG. 2B. Sealing member 200 may include a lip portion including an upper leg 210 and a lower leg 220. Each of upper leg 210 and lower leg 220 may be disposed at an angle to a longitudinal axis of sealing member 200 in cross-section, such that upper leg 210 and lower leg 220 substantially form a sideways V shape at one longitudinal end of sealing member 200 (i.e., the left end as depicted in FIG. 3). An angle A formed between upper leg 210 and lower leg 220 may vary in a range of approximately five degrees to approximately 175 degrees, and may preferably be approximately 95 degrees. The angle between upper leg 210 and lower leg 220 of the lip portion may be selected such that when sealing member 200 is compressed by an input force, a seal may be created between lid 120 and cooking chamber 110 without relying on pressure that may build up in cooking chamber 110.

Sealing member 200 may further include a first ridge portion including an upper ridge 250 and a lower ridge 260. Each of upper ridge 250 and lower ridge 260 may be disposed at an opposite longitudinal end to the longitudinal end of the sealing member with the lip portion (i.e., the right end as depicted in FIG. 3). A second ridge portion may be formed on sealing member 200, spaced apart from the first ridge portion. The second ridge portion may include an upper ridge 230 and a lower ridge 240.

Between the first ridge portion and the second ridge portion, a cutout portion may be formed in sealing member 200. The cutout portion may include an upper cutout 270 and a lower cutout 280. While each of upper cutout 270 and lower cutout 280 are depicted in FIG. 3 as substantially rectangular, the cutouts may be alternatively shaped, such as triangular, circular, semi-circular, ovaline, or the like.

FIG. 4 depicts a perspective view of sealing member 200, according to an embodiment of the invention, with the first and second ridge portions and the lip portion, as described above. In alternative embodiments of the invention, one or more of the first ridge portion, second ridge portion, and cutout portion may be omitted from sealing member 200.

FIG. 5 depicts a bottom view of lid 120 with sealing member 200, according to an embodiment of the invention. Thus, the underside of lid 120 that closes on cooking chamber 110 is depicted in FIG. 5. Lid 120 may include a lid liner 510 disposed on an inner surface of lid 120. Lid 120 may also include a retainer 520 that may be configured to retain sealing member 200 on the underside of lid 120. Retainer 520 may be secured to lid 120 by a plurality of fasteners 530. Fasteners 530 may be, for example, screws, bolts, nails, or other fastening means.

Figure 6:
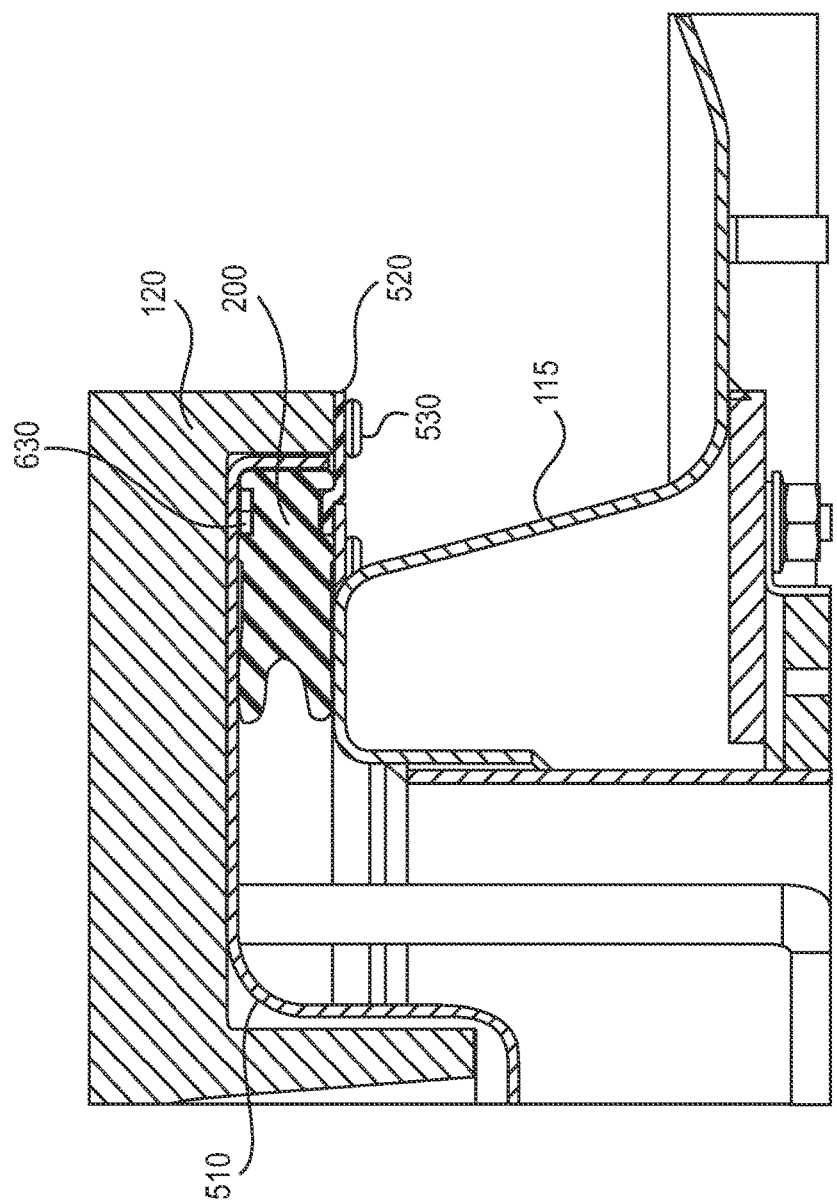
FIG. 6 is a partial side cutaway view of a cooking apparatus, according to an embodiment of the invention.

As depicted in FIG. 6, lid liner 510 may be disposed along an inner surface of lid 120 to conform to the shape of the inner surface if lid 120. In addition, lid liner 510 may be secured to lid 120 with one or more fasteners 630. Fastener 630 may be, for example, a screw, a bolt, a nail, or other fastening means. The upper portion of cooking chamber 110 may include band 115 onto which lid 120 may be configured to close to cover cooking chamber 110. Sealing member 200 may be disposed between lid liner 510 and band 115 to create a seal between lid 120 and cooking chamber 110 when lid 120 is moved into a closed position.

Sealing member 200 may be configured such that upper cutout 270 accommodates fastener 630. Further, sealing member 200 and retainer 520 may be configured such that lower cutout 280 accommodates a portion of retainer 520. Thus, when lid 120 is moved into a closed position, an input force is applied to sealing member 200 to compress sealing member 200.

When sealing member 200 is compressed, a seal is established between lid 120 and cooking chamber 110. In particular, a seal is created with seal member 200 in contact with a surface of lid liner 510 and band 115 of cooking chamber 110. As sealing member 200 is compressed, upper leg 210 and lower leg 220 are compressed, such that the angle between upper leg 210 and lower leg 220 decreases, as depicted in FIG. 6, showing sealing member 200 in a compressed state.

Figure 7:
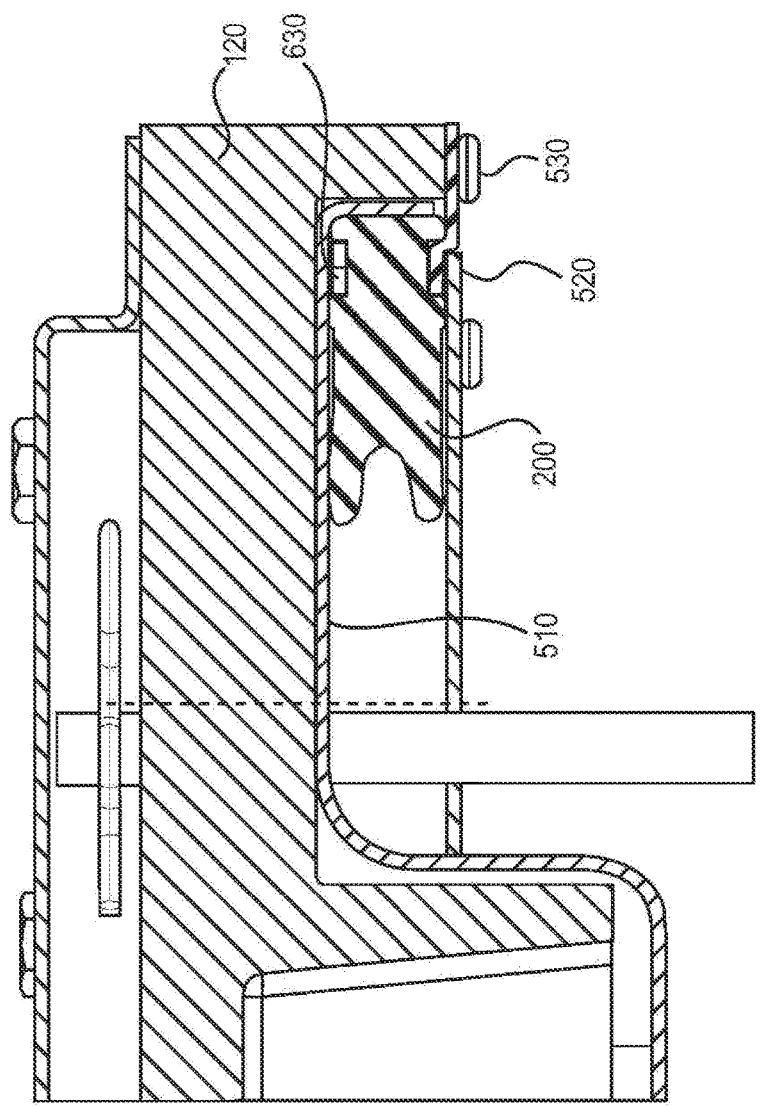
FIG. 7 is a partial side cutaway view of a cooking apparatus, according to an embodiment of the invention.

FIG. 7 depicts a partial side cutaway view of cooking apparatus 100, according to an embodiment of the invention. As depicted in FIG. 7, upper leg 210 of sealing member 200 may come into contact with lid liner 510 of lid 120, as lid 120 is closed to cover cooking chamber 110. Upper cutout 270 may be configured to accommodate fastener 630, which may secure lid liner 510 to lid 120. When fastener 630 is accommodated in upper cutout 270, upper ridge 250 of the first ridge portion may be disposed adjacent to fastener 630. Similarly, when fastener 630 is accommodated in upper cutout 270, upper ridge 230 of the second ridge portion may be disposed adjacent to fastener 630. In addition, when a portion of retainer 520 is accommodated in lower cutout 280, lower ridge 260 of the first ridge portion may be disposed adjacent to the portion of retainer 520. Similarly, when a portion of retainer 520 is accommodated in lower cutout 280, lower ridge 240 of the second ridge portion may be disposed adjacent to the portion of retainer 520. Accordingly, sealing member may come into contact with one or more of a surface of lid liner 510, a surface of band 115 of cooking chamber 110, a surface of retainer 520, and a surface of fastener 630 to create a seal between lid 120 and cooking chamber 110.

The configuration of sealing member 200 allows the input force that is required to create the seal to be reduced. In addition, a seal may be achieved with only this reduced input force, and without requiring a high pressure that may be built up in cooking chamber 110. The material of sealing member 200 may comprise an elastomer such as silicon rubber, viton, or the like. The material hardness may vary. Softer material may require less input force, but may also diminish sealing capacity. Harder material may require a greater input force to form the seal. The cross-section of sealing member 200 may take on a variety of shapes for the portion other than the V shape of the lip portion.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A cooking apparatus comprising:
   a cooking chamber configured to hold a cooking medium therein;
   a lid configured to cover the cooking chamber, the lid comprising:
      a lid liner disposed on an inner surface of the lid, and
      a retaining member disposed on the inner surface of the lid adjacent to an edge of the lid; and
   a sealing member disposed between the lid and the cooking chamber, the sealing member comprising:
      a first longitudinal end and a second longitudinal end opposite to the first longitudinal end,
      a lip portion comprising an upper leg and a lower leg, each disposed at an angle to a longitudinal axis of the sealing member to substantially form a V shape at the first longitudinal end of the sealing member, and
      a ridge portion comprising an upper ridge and a lower ridge, each disposed at the second longitudinal end, wherein the upper ridge is disposed adjacent to a fastener, and wherein the lid liner is secured to the lid with the fastener;
   wherein the retaining member is configured to retain the sealing member, and the sealing member is configured to create a seal between the cooking chamber and the lid, and wherein the sealing member has a substantially uniform cross section along an elongate length of the sealing member and taken transverse to the elongate length in an undeformed state of the sealing member.

2. The cooking apparatus of claim 1, wherein the cooking chamber further comprises:
   a cooking chamber band disposed at an upper portion of the cooking chamber,
   wherein the sealing member is configured to contact the cooking chamber band to create the seal between the cooking chamber and the lid.

3. The cooking apparatus of claim 1, wherein the sealing member is configured to contact the lid liner to create the seal between the cooking chamber and the lid.

4. The cooking apparatus of claim 1, wherein the sealing member further comprises:
   an upper cutout portion disposed adjacent to the upper ridge and a lower cutout portion disposed adjacent to the lower ridge.

5. The cooking apparatus of claim 4, wherein the upper cutout portion is configured to accommodate a portion of the fastener.

6. The cooking apparatus of claim 4, wherein the lower cutout portion is configured to accommodate a portion of the retaining member.

7. The cooking apparatus of claim 1, wherein each of the upper leg and the lower leg of the sealing member is configured to flex in response to an applied force generated by the lid covering the cooking chamber without pressure therein.

8. The cooking apparatus of claim 1, wherein the sealing member has a substantially rectangular profile when viewed from above.

9. The cooking apparatus of claim 1, wherein the sealing member has a substantially rectangular profile with rounded corners when viewed from above.

10. The cooking apparatus of claim 1, wherein an angle formed between the upper leg and the lower leg of the lip portion is about 95 degrees.

11. A sealing member comprising:
    a first longitudinal end and a second longitudinal end opposite to the first longitudinal end,
    a lip portion comprising an upper leg and a lower leg, each disposed at an angle to a longitudinal axis of the sealing member to substantially form a V shape at the first longitudinal end of the sealing member,
    a first ridge portion comprising a first upper ridge and a first lower ridge, each disposed at the second longitudinal end,
    a second ridge portion comprising at least one of a second upper ridge or a second lower ridge disposed between the first and second longitudinal ends, and
    an upper cutout portion disposed adjacent to the first upper ridge and a lower cutout portion disposed adjacent to the first lower ridge, wherein the upper cutout portion is configured to accommodate a portion of a fastener that secures a lid liner to the lid;
    wherein the lip portion is configured to be disposed between a lid and a cooking chamber of a cooking apparatus, and the lip portion is configured to create a seal between the cooking chamber and the lid.

12. The sealing member of claim 11, wherein the lower leg is configured to contact a cooking chamber band disposed at an upper portion of the cooking chamber to create the seal between the cooking chamber and the lid.

13. The sealing member of claim 11, wherein the upper leg is configured to contact the lid liner to create the seal between the cooking chamber and the lid.

14. The sealing member of claim 11, wherein the lower cutout portion is configured to accommodate a portion of a retaining member configured to retain the sealing member.

15. The sealing member of claim 11, wherein each of the upper leg and the lower leg of the sealing member is configured to flex in response to an applied force generated by the lid covering the cooking chamber without pressure therein.

16. The sealing member of claim 11, wherein the sealing member has a substantially rectangular profile when viewed from above.

17. The sealing member of claim 11, wherein the sealing member has a substantially rectangular profile with rounded corners when viewed from above.

18. The sealing member of claim 11, wherein an angle formed between the upper leg and the lower leg of the lip portion is approximately 95 degrees.

19. A cooking apparatus comprising:
- a cooking chamber configured to hold a cooking medium therein;
- a lid configured to cover the cooking chamber, the lid comprising:
  - a lid liner disposed on an inner surface of the lid, and
  - a retaining member disposed on the inner surface of the lid adjacent to an edge of the lid; and
- a sealing member disposed between the lid and the cooking chamber, the sealing member comprising:
  - a first longitudinal end and a second longitudinal end opposite to the first longitudinal end,
  - a lip portion comprising an upper leg and a lower leg, each disposed at an angle to a longitudinal axis of the sealing member to substantially form a V shape at the first longitudinal end of the sealing member, and
  - a ridge portion comprising an upper ridge and a lower ridge, each disposed at the second longitudinal end;
- wherein the retaining member is configured to retain the sealing member, and the sealing member is configured to create a seal between the cooking chamber and the lid, and wherein the sealing member has a substantially uniform cross section along an elongate length of the sealing member and taken transverse to the elongate length in an undeformed state of the sealing member.

* * * * *